UNITED STATES PATENT OFFICE.

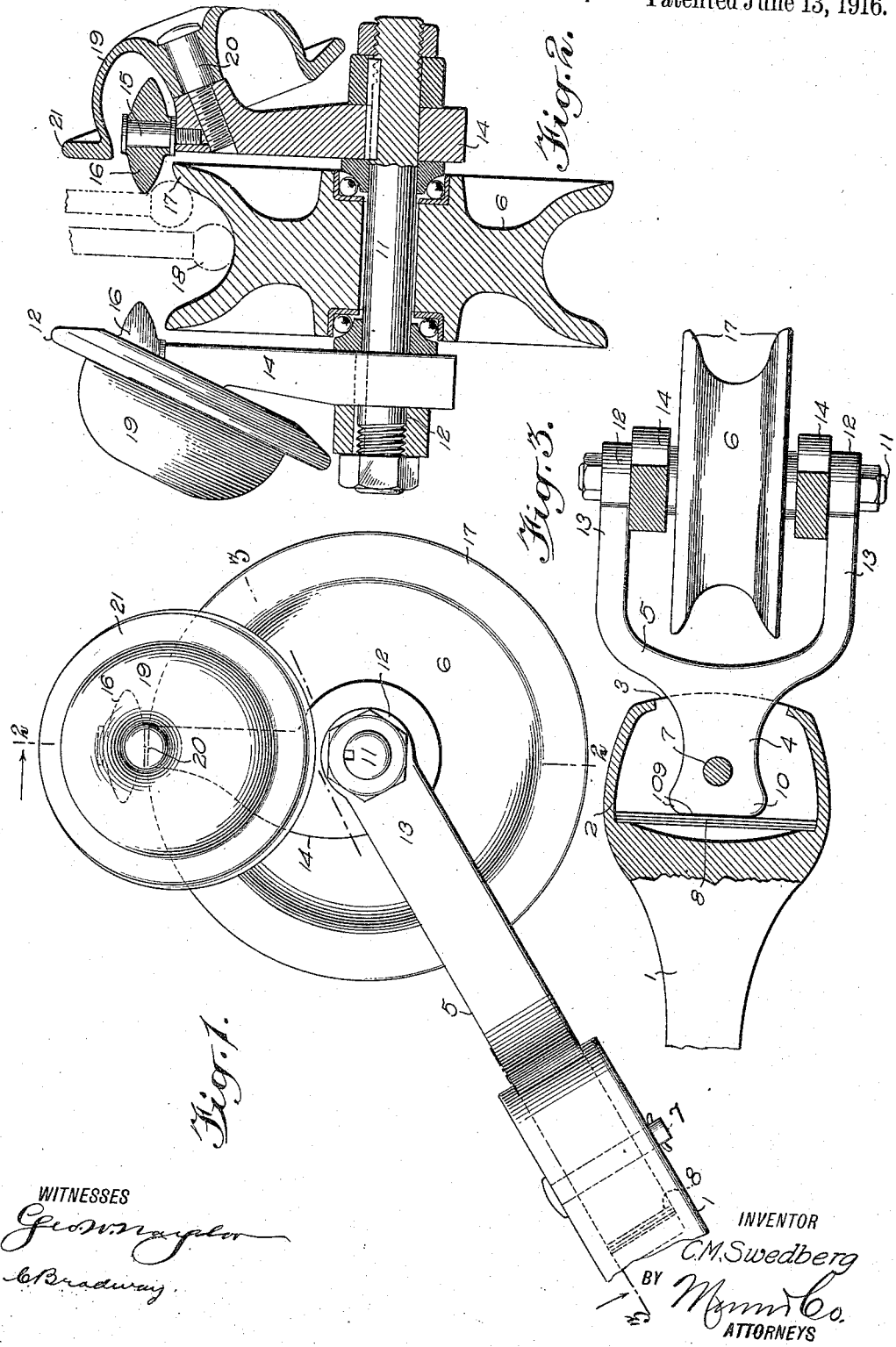

CHARLES M. SWEDBERG, OF YONKERS, NEW YORK.

TROLLEY-GUARD.

1,186,704.

Specification of Letters Patent.

Patented June 13, 1916.

Application filed June 26, 1915. Serial No. 36,487.

*To all whom it may concern:*

Be it known that I, CHARLES M. SWEDBERG, a citizen of the United States, and a resident of Yonkers, in the county of Westchester and State of New York, have invented a new and Improved Trolley-Guard, of which the following is a full, clear, and exact description.

This invention relates to trolley guards for the purpose of preventing a trolley wheel from automatically disengaging from the overhead current supply wire under which the trolley wheel is adapted to run.

The invention has for its general objects to improve and simplify the construction of trolley wheel retainers of the class referred to so as to be reliable and efficient in use, comparatively simple and inexpensive to manufacture, and so designed that the wheel can be easily disengaged from the wire when desired, or returned to the latter.

A further object of the invention is the provision of a trolley guard which has rotary members that project inwardly from opposite sides of and over the top of the flanges of the trolley wheel so as to prevent the trolley wire and wheel from disengaging, there being disposed over the said rotary members wheels which are adapted to engage cross-wires, supports and other devices of the overhead suspension system, so that the said members will be protected from injury by impact with such parts of the overhead suspension system. Thus smooth, easy and noiseless running is obtained.

Still another object of the invention is to provide a fork mounting for the wheel, which mounting is pivoted in the upper end of the trolley rod or harp in such a manner as to allow the wheel to have lateral movement, such lateral movement being yieldingly resisted by a centralizing spring acting on the mounting of the wheel.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views, Figure 1 is a side view of the trolley wheel with the guard applied thereto; Fig. 2 is a central vertical section on the line 2—2, Fig. 1, with one-half of the guard in elevation; and Fig. 3 is a sectional view on the line 3—3, Fig. 1.

Referring to the drawing, 1 designates a trolley pole which at its upper end is formed with a chambered head 2 that has an opening 3. Extending into this head is the shank 4 of a fork-shaped mounting 5 for the trolley wheel 6, the shank being secured by a pivot 7 so disposed as to permit the fork or mounting 5 to have lateral movement with respect to the plane of rotation of the wheel. The fork or mounting 5 is yieldingly held in central position by a laminated or leaf spring 8 which is positioned in the chambered head and is engaged by a flat surface 9 on the shank 4. As the trolley wheel is moved laterally by following the irregularities of the trolley wire, the corners 10 of the shank 4 act as cams on the spring 8, which in bowing allows the fork 5 to move out of such a position, but when the decentralizing force is removed, the spring 8 acts to return the fork 5 to central position.

The trolley wheel 6 rotates on a fixed axle 11 that has its ends fastened in bearings 12 in the upper ends of the members 13 of the fork. The guard is made in halves and each half is keyed to an end of the axle 11. Each section of the guard comprises a standard or equivalent support 14 keyed to the axle, and on the upper end of the standard is a vertical pivot or axle 15 on which rotates a wheel 16 which is of such size as to project inwardly over the top of the adjacent trolley wheel flange 17, so that the trolley wire 18 cannot leave the wheel as it creeps from the central broken line position to the dotted line position, Fig. 2. As these guard wheels 16 are free to rotate there is very little friction between them and the trolley wire when the latter engages the wheels or when the trolley hangers or other supporting devices for the trolley wire come into contact with the guard wheels. There is considerable space between the peripheries of the opposed guard wheels 16, so that the conductor can readily pull the trolley wheel downwardly out of engagement with the trolley wire or allow the wheel to reëngage the latter without the guard wheels 16 interfering. With this arrangement of guard elements it is necessary to hood or shroud the latter so as not to be broken by overhead cross-wires, hangers and the like. For this purpose rotary hood wheels 19 are mounted on each standard 14 and they turn on axles 20 which are disposed in the upper ends of the standards at a slight angle to the axle 11 of the trolley wheel. In other words, the planes of rotation of the hood wheels 19 are similarly inclined to the plane of rotation of the trolley wheel. Each hood wheel has a peripheral flange 21 which is adapted to come into contact with cross wires or other supporting parts of the overhead suspension system to thereby protect the guard wheels 16 from being injured.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a trolley wheel, a support therefor, members disposed at opposite sides of the wheel, small guard wheels mounted on the members and extending inwardly from opposite sides and over the top of the trolley wheel, the peripheries of the guard wheels being spaced apart a fixed distance to provide for the engagement and disengagement of the trolley wheel and overhead trolley wire, and rotatable hooding elements projecting over the top of the guard wheels.

2. The combination of a trolley wheel, a support therefor, members disposed at opposite sides of the wheel, small guard wheels mounted on the members and extending inwardly from opposite sides and over the top of the trolley wheel, the peripheries of the guard wheels being spaced apart a fixed distance to provide for the engagement and disengagement of the trolley wheel and overhead trolley wire, and rotatably mounted hood wheels mounted on the members and extending over the guard wheels.

3. The combination of a supporting fork, an axle fastened therein, a trolley wheel on the axle, standards fastened to the axle and extending upwardly, guard wheels mounted on the upper ends of the standards to turn on substantially vertical axes and extending inwardly from opposite sides of and over the top of the trolley wheel with the peripheries spaced apart to permit the trolley wheel to be moved into and out of engagement with an over-head wire, and protecting devices mounted on the standards and extending over the guard wheels.

4. The combination of a supporting fork, an axle fastened therein, a trolley wheel on the axle, standards fastened to the axle and extending upwardly, guard wheels mounted on the upper ends of the standards to turn on substantially vertical axes and extending inwardly from opposite sides of and over the top of the trolley wheel with the peripheries spaced apart to permit the trolley wheel to be moved into and out of engagement with an overhead wire, and hood wheels mounted to turn on inclined axes and extending over the top of the guard wheels, the portions of the hood wheels extending above the guard wheels being spaced apart a fixed distance so as not to interfere with the trolley wheel engaging or disengaging the overhead wire.

In testimony whereof I have signed my name to this specification in the presence of two subscribing witnesses.

CHARLES M. SWEDBERG.

Witnesses:
C. BRODWAY,
PHILIP D. ROLLHAUS.

Copies of this patent may be obtained for five cents each, by addressing the "Commissioner of Patents, Washington, D. C."